Figure 6:
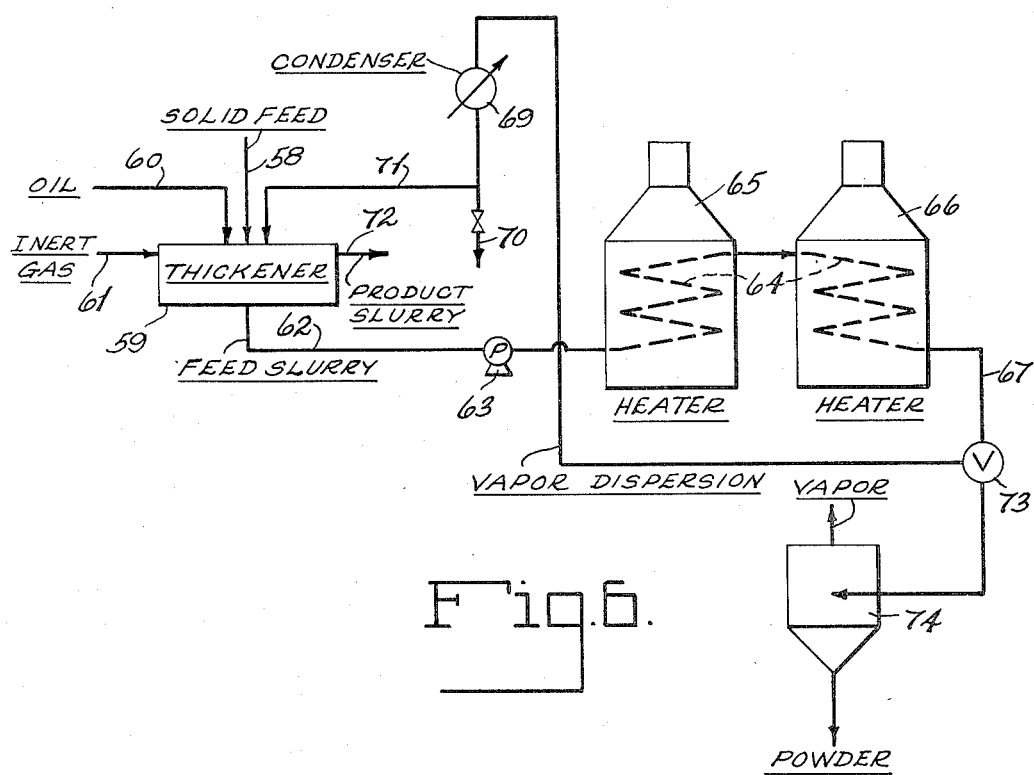

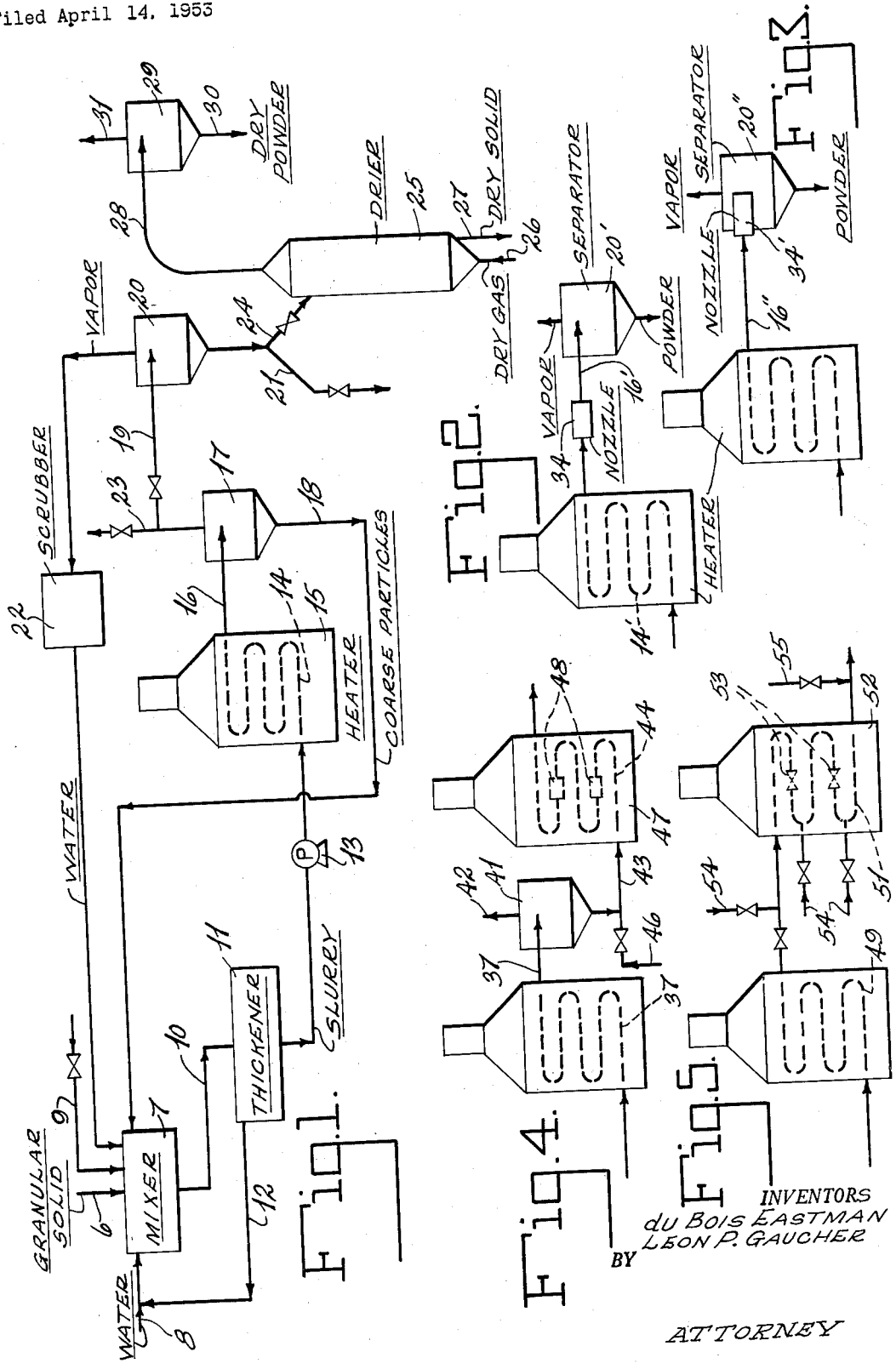

United States Patent Office 2,735,787
Patented Feb. 21, 1956

2,735,787

PROCESS FOR PULVERIZING SOLID MATERIALS

Du Bois Eastman, Whittier, Calif., and Leon P. Gaucher, Tuckahoe, N. Y., assignors to The Texas Company, New York, N. Y., a corporation of Delaware Application April 14, 1953, Serial No. 348,642

24 Claims. (Cl. 117—66)

This invention relates to a process for the disintegration of solid materials by employing fluid energy. In one of its specific aspects, it relates to the simultaneous pulverizing and drying of solids.

The process of this invention provides a novel method by which disintegratable solid materials may be economically disintegrated or pulverized, and at the same time dried, if desired, without resorting to usual power-consuming methods. The process may be used for reducing the particle size of various materials in granular form and may be applied to the pulverization of carbonaceous materials such as coal, non-carbonaceous minerals such as limestone, gypsum, chalk, clay, marl, talc, and barite, metals such as aluminum and magnesium, and other materials such as wood and oyster shells.

This application is a continuation-in-part of our application Serial No. 49,626 filed September 16, 1948, and of our application Serial No. 110,442 filed August 15, 1949, now abandoned.

In our co-pending application Serial No. 49,626 our novel process was first disclosed for heating and pulverizing carbonaceous solids, but the principles of the invention have also been found to apply to the disintegration of numerous other solid materials.

Fluid-energy grinding wherein solid particles are circulated through an enclosed system by a flowing stream of gas in a fluid-energy or jet mills has been known for some time. Heretofore the solid particles have always been entrained directly in the gas.

In accordance with the present invention numerous new advantages to be set forth hereinafter are provided by first suspending the relatively coarse granular particles in a vaporizable liquid to form a free-flowing suspension or slurry. The flowable mixture is then continuously fed as a confined stream into a heating zone in the initial portion of a heated tube of substantial length compared to its inside diameter. In the tube the liquid component of the slurry is heated to a temperature well above its boiling point at the pressure existing in the tube, thereby forming a dispersion of solid particles in the resulting vapor which flows turbulently at high velocity through the latter portion of the tube to effect grinding. During the grinding operation the dispersion is maintained at a temperature well above the boiling point, but below the temperature at which chemical reaction occurs between the vapor and the material being ground. When chemical change is to be avoided completely, as by preventing the loss of components by volatilization, the temperature is kept low enough to avoid such chemical change, for example below about 400° F. for coal. As a result, relatively fine disintegrated particles of the solid material can be withdrawn from the tube in substantially an unchanged condition chemically; and substantially the same mass of solid material can be withdrawn as was originally put in.

Materials that are stable chemically can be disintegrated at temperatures up to 1,400° F. under low pressures, but higher pressures may require lower temperatures such as a 1,200° F. maximum. The main criterion is the ability of the equipment to withstand the operating conditions. Less stable materials may require lower maximum temperatures. For example volatiles may be distilled off and some chemical reaction with steam may occur when disintegrating anthracite coal at temperatures exceeding 1,100° F.; bituminous coal above 850° F., and lignite above 700° F.

The statement that the heated tube is of substantial length compared to its inside diameter, as used herein, is intended to mean that the tube is sufficiently long to assure substantially complete vaporization of the liquid components of a slurry passing through an initial portion thereof when the tube is heated, and to provide a subsequent path of sufficient length to assure that solid particles in the resulting vaporous dispersion are disintegrated during flow of the dispersion therethrough. Ordinarily the length of the tube is of the order of hundreds of times its inside diameter, but the selection of the proper ratio of length to inside diameter will be well within the skill of the art after consideration of the following description and examples.

The term "free-flowing slurry" as used herein is intended to designate a suspension of solid particles in liquid in such proportions that the suspension exhibits the general flow properties of a liquid in that it will flow through a downwardly extending conduit under the influence of gravity.

The invention will be more readily understood from the accompanying drawings and the following detailed description of preferred modes of operation of the process.

Figure 1 of the drawings is a diagrammatic elevational view showing a suitable arrangement of apparatus for carrying out one modification of the present invention and;

Figures 2 to 6 are diagrammatic elevational views illustrating modifications of apparatus for performing variations of the process.

The liquid used for preparation of the slurry or suspension for our process should be stable and inert with respect to reaction with the solid at the temperature of the heating zone. For convenience in the description of our process water is referred to as the vaporizable liquid. It is to be understood that while water is taken as a preferred example for the purpose of illustration, other vaporizable liquids may be admixed with or substituted for water. Generally, water and liquid hydrocarbons are the most suitable liquids for this purpose. However, various other liquids may be used, for example, coal tar distillates, alcohols, glycols, mercury, diphenyl, carbon tetrachloride, Dowtherm, and the like. Water and oil mixtures, suitably in the form of emulsions, may also be used in preparing the suspension. An emulsifying agent may be used as an aid in forming an emulsion of the oil and water in making up the slurry.

With reference to Figure 1, relatively coarse particles of a solid in granular form are introduced through line 6 into a mixer 7. Sufficient water to form a fluid dispersion is admitted to the mixer through line 8. The resulting suspension or slurry of solid particles in water is passed through line 10 to a thickener 11 of conventional design wherein excess water is removed to produce a slurry containing the desired proportions of liquid and solid. Excess water is discharged from the thickener through line 12 and returned to the mixer.

Additive materials, e. g., other solid materials, wetting agents, etc. may also be added to the mixer through line 9 as an aid in the preparation of the slurry and in the disintegration of pervious solid particles. Dispersion of the solid particles in the liquid may also be promoted by mixing with the slurry a deflocculating agent such as tannins extract from chestnut bark, pecan hulls, gall nuts.

and quebracho; or caustic soda or potash; or rosin soaps. Such agents are especially desirable when recycling of the product is employed because the particles to be kept in suspension then are extremely fine. For example, one pound of agent to 400 pounds of slurry may be used.

When hard water is used for the slurry there may sometimes occur a deposition of calcium carbonate on the walls of the heated pipe. To obviate this the water advantageously can be softened to remove calcium, as by the exchange of calcium ions for sodium ions in a zeolite bed located ahead of the slurry tank.

The proportion of liquid admixed with the solid to form a fluid slurry may vary considerably, but generally is less than 2:1 by weight, often being about 1:1. A minimum of about 35% liquid by weight is required. The liquid content of the slurry may be controlled by first mixing the solid with a quantity of water in excess of the required amount, and then adjusting the water content by removal of excess water in a conventional thickener. The slurry may be readily pumped with suitable equipment, for example, with a piston pump of the type commonly used for handling drilling mud in well drilling operations.

The size of the solid particles fed to the process is not of especial importance to the successful operation of the invention. Particles which may be passed through the conduits without difficulty may be used, e. g., particles having an effective diameter less than one-third the pipe diameter. In most applications of this process, the solid feed material must be reduced only to a particles size such that it may be readily handled as a suspension or slurry. It is preferable to use particles smaller than about ¼ inch in average diameter. The solids may be crushed mechanically to from about ¼ inch in average diameter to about 100 mesh size with a relatively small expenditure of power. Further reduction in size by conventional mechanical means becomes progressively more expensive, mechanical pulverization requiring large expenditures of power.

The slurry is withdrawn from the thickener to a pump 13 from which it is passed into and through the initial portion of a heated tube 14 at a rate sufficient to prevent settling out of the solid particles, generally at a linear velocity within the range of ½ to 10 feet per second, suitably about 1 foot per second. Heat may be supplied to the tube 14 from any suitable source, such as a gas-fired pipe still type furnace 15 such as commonly used for heating liquid streams in refining petroleum. The slurry is heated in the initial vaporizing section of tube 14 to a temperature at least sufficient to vaporize the liquid, and the resulting dispersion of solid particles in vapor flows at high velocity through the latter pulverizing portion of the tube 14. The velocity of the gaseous dispersion at the outlet of the tube is greater than 25 feet per second, which is about the minimum velocity for carrying many materials through a tube. As a practical matter, to assure rapid and substantial disintegration adequate for commercial operation, the velocity is usually maintained above 100 feet per second. In most cases, however, the velocity far exceeds 25 feet per second, sometimes being several thousand feet per second. The solid is thus subjected to the disintegrating action of vaporization and the highly turbulent flow resulting from high velocities.

Tube 14 can have any desired shape, such as single or double helical coils, parallel straight pipe lengths connected by return bends, or even a long straight length of pipe. Also, it can comprise a series of two or more similar sections each located in its own heating furnace; or a combination of the aforementioned shapes.

Pressure, in itself, is not critical in the heating step. The temperature and pressure relationships affecting vaporization are well known. Generally, it is desirable to maintain the pressure at a low value, particularly in that portion of the tubing in which the carrier liquid exists as a vapor to provide large vapor volume and high velocity.

In one grinding test conducted on talc, thermocouples for temperature measurement were connected into the ½ inch grinding pipe at various points along its length. It was found that the first 720 feet of pipe constituted a liquid heating zone wherein the slurry water was brought up to the boiling point (about 500° F.) for the operating pressure, boiling was completed in the next 360 feet constituting a boiling zone, and superheating of the vapor to about 660° F. occurred in the last 252 feet constituting a superheating zone. The pressure dropped from about 1,160 pounds per square inch at the inlet to about 390 near the outlet.

The dispersion is discharged through line 16 into a classifier 17. Line 16 may be of any desired length to take advantage of additional pulverizing action due to turbulent fluid flow following vaporization. The classifier 17 separates coarse oversized pulverized solid particles from the dispersion, and the latter passes either by way of a conduit 19 to a separator 20, or by way of a conduit 23 for use as a dispersion. The oversized particles may be returned for further pulverization via line 18 to the mixer 7. When the dispersion passes by a conduit 19 to a separator 20, the fine particles are separated from the vapor and withdrawn as product from the bottom of separator 20 through line 21.

Alternatively, the heated solid particles from separator 20 may be passed through line 24 into a drier 25. Since the powdered material is hot when it leaves separator 20, to effect drying it is necessary only to strip the solids with a dry gas that is inert to the powder under the conditions existing in the drier. Distillation of volatilizable constituents from the pulverized solid, as in the case of coal, may also be accomplished in the drier by heating the solid to a high enough temperature. Dry gas may be admitted to the drier 25 through line 26, and is preferably passed upwardly through a dense phase fluidized bed of the powdered material in the drier, using the dry gas as the fluidizing medium. Dry solids may be withdrawn through line 27. The gas is discharged from the drier through line 28 into a separator 29. Particles of powdered solid material entrained in the gas stream leaving the drier are separated from the gas in the separator and discharged through line 30, and the gases are discharged through line 31.

The loss of powder from the top of the separator 29 is reduced by permitting a part of the vapor (say 10–20%) to leave with the powder through line 21, control being effected by a throttling valve in the vapor line from the separator. Vapor from the separator 20 may be condensed at 22 and returned to the slurry.

The separation of gases, vapors, or oversized particles may be accomplished in various ways, as is known in the art. Cyclone separators and classifiers are generally most effective; Cottrell precipitators or filters may be used for removal of fine particles from gases or vapors; and combinations of these devices may be used.

A mixture of solid materials may be treated by the present process to produce a powdered mixture. For example, clay and calcium carbonate (as in marl) to form a premix for subsequent roasting in the manufacture of Portland cement may be slurried together, ground, and dried or partly dried by the present process.

Solids which are soluble in the liquid may be added to the slurry and evenly distributed on the surface of the insoluble solid material. Impregnated catalysts may be so prepared, such as a hydrocarbon synthesis catalyst prepared by forming a slurry of magnetite with water containing dissolved potassium carbonate.

The following examples illustrate how the process of the invention has been performed with apparatus similar to that of Figure 1. All pressures in this specification are gauge pressures.

*Example I*

A slurry of 26.8% by weight of Dixie clay in water was ground by passing it at a rate of about 550 pounds per hour through 360 feet of ½ inch extra heavy heated steel pipe arranged in three separately heated coils of 120 feet each. The feed pressure was about 770 pounds per square inch, the outlet pressure was atmospheric at the separator, and the temperature at the outlet was about 990° F. The outlet velocity was calculated as about 2050 feet per second.

*Example II*

A slurry consisting of 64% by weight of barite in water was fed under 630 pounds per square inch pressure at a rate of 615 pounds per hour through a series of four heated pipe coils of ½ inch pipe totaling 960 feet in length. The temperature and pressure at the outlet were 825° F. and 160 pounds per square inch, respectively. The velocity at the outlet was computed to be about 127 feet per second. The particle sizes of the feed and the pulverized product are tabulated below:

| Feed, percent by weight | Particle Size (Microns) | Product, percent by weight |
|---|---|---|
|  | less than: |  |
| 90 | 40 | 98+ |
| 82 | 30 | 98+ |
| 68 | 20 | 98+ |
| 57 | 15 | 97 |
| 42 | 10 | 93 |
| 35 | 8 | 90 |
| 28 | 6 | 83 |
| 20 | 4 | 71 |

*Example III*

A slurry of anthracite coal in water, containing 60% by coal by weight, was pumped at a rate of 485 pounds per hour and at a pressure of 450 pounds per square inch to a heated coil of ½ inch extra heavy pipe 120 feet long followed by a second heated coil of ⅜ inch extra heavy pipe 120 feet long. The temperature at the outlet of the second coil was about 750° F. and the pressure was atmospheric. The velocity at the outlet did not exceed the sonic velocity, and was computed to be about 2655 feet per second. The particle size of feed and product are tabulated below:

| Particle Size—U. S. Standard Sieves | Feed, percent by weight | Product, percent by weight |
|---|---|---|
| less than: |  |  |
| 40 mesh | 97.4 |  |
| 45 mesh | 94.5 |  |
| 50 mesh | 90.7 |  |
| 60 mesh | 85.6 | 100 |
| 70 mesh | 81.7 | 99.8 |
| 80 mesh | 76.5 | 99.6 |
| 100 mesh | 71.0 | 99.0 |
| 140 mesh | 61.9 | 97.8 |
| 200 mesh | 51.6 | 92.7 |
| 230 mesh | 48.0 | 90.0 |
| 325 mesh | 42.8 | 83.6 |

*Example IV*

A slurry consisting 40% by weight of crushed oyster shells in water was pumped at a rate of 800 pounds per hour and at a pressure of 500 pounds per square inch through 300 feet of ½ inch extra heavy heated pipe coils. The temperature at the outlet was 650° F., and the pressure was atmospheric. Velocity at the outlet did not exceed the sonic velocity, and was computed to be about 3610 feet per second. The size of the feed material was such that 87.23% passed a 40 mesh U. S. Standard Sieve and 19.67% passed a 325 mesh sieve. All of the ground product passed a 325 mesh sieve.

*Example V*

A slurry consisting about 44% by weight of talc in water was pumped at 505 pounds per square inch through four heated coils of ½ inch extra heavy pipe, each coil being 100 feet long, at a rate of 935 pounds of slurry per hour. The temperature at the outlet of the pipe was 900° F. and the pressure at the outlet was 32 pounds per square inch. Velocity at the outlet was calculated as 1540 feet per second. The size of talc particles fed to the pipe was such that the median particle size was 180 microns. The product obtained after the grinding process was so much finer than the feed that the median particle size was 4 microns.

*Example VI*

A water slurry containing 50% by weight of granular Utah bituminous coal was passed successively into 120 feet of coiled ½ inch pipe, 120 feet of coiled ¾ inch pipe, and a third length of 100 feet of straight 1 inch pipe at the rate of 750 pounds per hour. The first two coils were heated, and the straight pipe was lagged with asbestos to reduce heat loss.

Another test was run wherein the third length of straight pipe was replaced by an unheated 100 foot long coil of 1 inch pipe, other conditions being identical.

In each test the outlet temperatures were 460° F., 700° F., and 300° F., from the three lengths of pipe, and the outlet pressure from the third length was atmospheric.

The following table of results shows that a coil was no better than a straight pipe for the third length.

| Particle Size (Microns) | Feed (weight percent) | Product (weight percent) | |
|---|---|---|---|
|  |  | 100 ft. Straight | 100 ft. coil |
| Less than: |  |  |  |
| 60 | 39 | 93 | 90 |
| 40 | 31 | 89 | 89 |
| 25 | 23 | 83 | 87 |
| 20 | 20 | 79 | 84 |
| 15 | 16 | 60 | 79 |

In the modification shown in Figure 2 the dispersion of solid particles in vapor leaves the heater portion of tube 14' and passes through a pressure reducing nozzle 34 of smaller diameter than the tube 16' located in the outlet portion of tube 14' at a position spaced from the separator 20'. Nozzle 34 can be a convergent nozzle, a convergent-divergent nozzle (when supersonic velocity is desired), a simple orifice, or any other means for suddenly reducing the pressure by a large amount and greatly increasing the volocity of the dispersion in the latter portion of the grinding tube prior to its withdrawal therefrom. Nozzle 34 maintains a relatively high back pressure, say 200 or 300 pounds per square inch, on heater tube 14' to keep the velocity down to a relatively low value upstream of the nozzle and thus reduce erosion of the tube, while at the same time assuring extremely high-velocity turbulent flow of the dispersion in a localized area to improve the grinding effect. Heat transfer is improved in the heater tube and its operation is easier to control with a nozzle in the system. The following data illustrate operation with a nozzle:

*Example VII*

A 50% by weight slurry of talc in water was passed at a rate of 712 pounds per hour through 800 feet of ½ inch heater pipe 14' (arranged as parallel straight pipes connected by return bends) to a convergent-divergent nozzle 34 spaced about 15 feet from a cyclone separator 20', and having a minimum diameter of ¼ inch. The pressures in pounds per square inch were 744 at the entrance to the heater pipe, 195 at the nozzle inlet, and atmospheric at the cyclone. The temperature at the nozzle inlet was 872° F. The velocity at the heater outlet upstream of the nozzle was computed to be approximately 200 feet per second, and at the nozzle was several thousand feet per second (supersonic).

The talc was so pulverized that its median particle size was reduced from 9.5 microns to 1.6 microns.

Figure 3 illustrates an arrangement similar to Figure 2 except that the pressure reducing nozzle 34' is located at the end of the discharge pipe 16" so as to discharge directly into the cyclone separator 20".

Figure 4 illustrates a modification of the heating and pulverizing steps in which means is provided for improving the pulverization over that obtained by the apparatus of Figure 1. In accordance with this modification, the tubular heater 37 serves mainly as a vaporizer, and dispersion of solid particles in vapor discharged from the heating tube 37 is passed to a separate pulverization zone for additional pulverization. A separator 41 may be provided at the outlet of heating tube 37 by means of which part or all of the vapors may be removed from the solid following vaporization of the liquid and initial grinding of the solid but before extensive pulverization takes place. Separation of the vapors, or part of them, is sometimes desirable where the powdered solid may be used admixed with a limited amount of vapors. Gas, e. g., air for subsequent oxidation, may be added to the dispersion or may replace the separated vapors in the pulverization zone. The vapors are discharged from the separator through line 42 while the solid material is passed through line 43 into a separate pulverizing zone comprising a conduit 44. The other gas may be admitted to the conduit 44 through line 46.

The gasiform dispersion of solids is passed through conduit 44 at high velocity. The conduit 44 may be unheated or heat may be supplied by any suitable means, for example, by a furnace 47. Suitable means 48 for increasing turbulence may be provided at one or more points along the conduit 44. These may effect increased turbulence by sudden changes in the velocity or direction of flow of the stream as an aid to disintegration. This may be accomplished by a valve, orifice, Venturi, or baffles.

Figure 5 illustrates another method for improving the extent of pulverization in the tubing. As in the modification of Figure 4, the tubular heater 49 serves mainly as a vaporizer. The stream of vapors and solid particles from the heating tube 49 is discharged into a second tube 51 acting as a principal pulverizing zone. This tube may be of the same size or smaller in cross-sectional area than tube 49. Heat is supplied to the tube 51 by any suitable means as, for example, by a furnace 52. A series of devices 53 is provided by means of which the pressure may be suddenly decreased at various points along the path of flow These may take any suitable form and may comprise throttling valves, orifices, Venturi nozzles, baffles, etc. By suddenly decreasing the pressure, when liquid of the slurry has been heated almost to the boiling point, flash vaporization of the liquid may be obtained at one or more points along the path of flow. The sudden pressure drop, accompanied by rapid vaporization of liquid and sudden expansion of the vapors, tends to increase the velocity of flow and the rate of disintegration of the solid material.

Alternatively, or concurrently, additional liquid may be injected into the dispersion in the pulverization zone through lines 54. The injection of liquid causes shock cooling of the particles and rewetting of the particles. Sufficient heat is supplied following the rewetting to revaporize the liquid. Liquid may also be introduced through line 55 into the vapor stream at the outlet of coil 51. This may be used for shock cooling the solid, after which the liquid may be revaporized by pressure reduction, or the powdered solid may be recovered as a slurry.

In Figure 6 there is shown an arrangement of apparatus for recycling the fluid and particles of solid through a closed system to obtain finer grinding than is possible with only one pass. This is especially desirable when the fluid or the solid particles must be protected against contamination from atmospheric components such as oxygen and water vapor. An an additional safeguard against such contamination all pump packings, pipe joints, valves and the like should be proof against the inflow of atmospheric components.

The modification of our novel method as performed with the apparatus of Fig. 6 will be described below, by way of example only, as applied to the grinding of metals.

A metal in solid particle form is introduced through line 58 into a hydraulic classifier or thickener 59. A liquid which is inert to the metal, for example hydrocarbon oil, is supplied to the thickener through line 60. An inert gas such as argon under pressure may be introduced through conduit 61 to blanket and protect the slurry by excluding the ambient atmosphere from contact with the slurry and subsequent dispersion. A hydraulic classifier of the type known as a Dorr thickener or classifier is suitable.

A slurry of metal particles in oil is withdrawn from the thickener through line 62 to a pump 63, from which it is passed into a tubular heater 64. Heat may be supplied to the heater 64 by any suitable means, as by furnaces 65 and 66. The tubular heater 64 suitably comprises two or more spirally wound coils of tubing.

Substantially all of the liquid is vaporized from the slurry in the heater, wherein it is heated to a temperature well above the boiling point. Vaporization of the oil results in the formation of a dispersion of solid particles of metal in the oil vapor which passes at high velocity through the tubing 64. The metal particles are subjected to the disintegrating action of the highly turbulent flow resulting from high velocities developed in the tubing 64.

A gasiform dispersion of solid particles in vapor is discharged from tubing 64 and passed through line 67 to a condenser 69. Line 67 may be any desired length to take advantage of the available additional pulverizing action due to turbulent fluid flow therein.

Condensation of the vapors by condenser 69 forms a reconstituted slurry of metal particles in oil wherein the particles are smaller in size than those initially fed to tube 64. Slurry may be withdrawn from condenser 69 through line 70 as product, if so desired. Preferably the slurry from condenser 69 is passed through line 71 to the thickener 59 where the metal particles are subjected to gravity classification. Those particles which are fine enough to meet product specifications are withdrawn from thickener 59 as a slurry through line 72. Those particles which do not meet product size specifications are recycled through line 62 to the pulverizer tubing 64 to pulverize the particles still further.

Alternatively, a three way valve 73 may be turned to direct the particle laden vapor from tubing 64 to a cyclone separator 74 when the recycling has been completed so that a dry product may be collected.

*Example VIII*

One hundred pounds of aluminum which had been previously pulverized mechanically so that 72 per cent was finer than 40 microns was mixed with 300 pounds of kerosene to form a slurry and passed into a tubular pulverizer comprising three sections of extra heavy tubing disposed in a gas-fired furnace, each being 120 feet long and wound in an 18½ inch I. D. helical coil. The first and second coils were ½ inch tubing while the third was ¾ inch tubing.

The aluminum was processed in a closed cycle with complete condensation of the vapor dispersion and return of the slurry of solids and condensate from the condenser 69 to the pulverizer. The slurry was fed to tubing 64 at the rate of 1,000 pounds per hour for a total of 44 hours. The pressure at the inlet to the first coil was maintained at 150 pounds per square inch. Heat input to the coils was adjusted to maintain a temperature of 360° F. at the outlet of the first coil, and 600° F. at the outlets of each of the second and third coils. Pressure at the outlet of the third heater was 9 pounds per square inch, and velocity at the outlet was computed as 190 feet per second.

A comparison of the particle sizes of the feed and the product at different intervals during the run, as determined by sedimentation tests follows:

| Particle Size (Microns) | As Received | After 16 hrs. | After 40 hrs. | After 44 hrs. |
|---|---|---|---|---|
| less than: | Percent | Percent | Percent | Percent |
| 40 | 72 | 98 | 99+ | 99+ |
| 30 | 54 | 93 | 96 | 99 |
| 20 | 24 | 74 | 86 | 95 |
| 10 | 4 | 7 | 50 | 81 |
| 5 | | | 14 | 45 |

*Example IX*

A slurry of magnesium in kerosene was fed into a tubular pulverizer 64 comprising three heated coils. Each heater contained 230 feet of ½ inch extra heavy seamless pipe in the form of double coils. The double coils in each heater were formed by winding the pipe on 14 inch and 18 inch mandrels with a pitch of 2 inches.

The slurry was made up of 95 pounds of magnesium powder mixed with about 250 pounds of kerosene. This gave a slurry containing approximately 27 weight per cent magnesium. As in Example VIII the dispersion of magnesium in vapor from the third heater was condensed at 69 and the resulting slurry recirculated to the inlet of the first heater in a closed cycle. The run lasted 115 hours with a slurry feed rate of 1,000 pounds per hour.

| | Pressure (pounds per square inch) | Temperature (° F.) |
|---|---|---|
| Pump Discharge | 200 | 115 |
| 1st Heater Outlet | 185 | 500 |
| 2nd Heater Outlet | 135 | 640 |
| 3rd Heater Outlet | 70 | 750 |

The maximum velocity obtained in the tubular heating coils was calculated as approximately 350 feet per second.

The magnesium powder fed to the pulverizer had the following initial particle size distribution:

U. S. sieve number: Weight per cent on sieve
- 100 _____ 0.7
- 140 _____ 5.8
- 200 _____ 38.5
- 230 _____ 11.6
- 325 _____ 35.7
- Pan _____ 7.7

The average particle size of the resulting product as determined by a Fischer sub-sieve sizer ranged from 2.65 to 3 microns. Examination with an electron microscope indicated most particles ranged from 0.2 to 1.0 micron.

Without wishing to limit the present invention in any way, the following explanation is offered as a possible mechanism of the disintegrating action obtained in the present process. The highly turbulent flow of the vapors through the piping causes innumerable collisions between the particles. This results in a high degree of pulverization which may be carried to the point where the average diameter of the particle is on the order of from 1 to 5 microns. This may possibly be supplemented by the rapid expansion and violent transfer of energy to the solid particles when the liquid is vaporized from the surface of the particles.

Among the new and important advantages flowing from our novel steps of feeding as a slurry the material to be ground, and then heating the slurry to produce in situ the vapor necessary for grinding are the following:

A. A wet product can be fed into the system and dried concurrently with the grinding operation.

B. In the slurry grinding process large quantities of solid material can be suspended in relatively small quantities of fluid, and high fluid velocity and turbulence are developed throughout the grinding system; whereas fluid energy and jet mills require large quantities of fluid, and develop high velocity and turbulence only in the immediate vicinity of the jets. Consequently the slurry grinding process usually operates with a fluid-to-solid ratio of less than 2:1, more often 1:1, and occasionally even 1:2; whereas commercial fluid energy and jet grinding mills generally require ratios over 5:1, and for superfine grinding ratios as high as between 10 and 20:1 are required. Thus the fluid energy is used more efficiently in the slurry grinding process.

C. In slurry form a suspension of large quantities of solid in small quantities of liquid is easily made up and can be transported efficiently over long distances to the grinding plant, whereas in fluid energy and jet mills the feed into a gas stream is more cumbersomely handled.

D. The slurry grinding process is characterized by a high heat efficiency because the heat is applied to vaporize the liquid in the grinding zone, and it is unnecessary to vaporize a liquid a substantial distance away from the grinding zone and then convey the resulting vapor to the grinding zone as in other processes.

E. Vaporization of the liquid while in contact with the solid particles in the slurry grinding process insures intimate mixture of the particles with the vapor being generated, so that each particle is promptly and efficiently acted upon. In other processes wherein the solid particles are fed into a vapor stream from a separate source, with some substances there are difficulties in breaking up the feed sufficiently to subject each particle to independent vigorous action, the result being that slugs of solid pass through the system and non uniform grinding is obtained.

F. In the slurry process substantial variations in the rate of feeding slurry to the system can be tolerated without detrimentally affecting the grinding results; whereas fluid energy and jet mills are quite sensitive to variations in feed rate, which cause non uniform grinding.

G. The amount of mechanical power required to convert a granular solid to fine powder is relatively small. The major portion of the energy required for pulverization is supplied by heating the slurry. Heat may be obtained from an inexpensive source whereby considerable savings may be realized as compared with conventional mechanical pulverization.

Obviously, many modifications and variations of the invention as hereinbefore set forth may be made without departing from the spirit and scope thereof, and therefore, only such limitations should be imposed as are indicated in the appended claims.

We claim:

1. A process which comprises pulverizing a mass of relatively coarse particles of at least one solid disintegratable material by mixing said particles with a vaporizable liquid and forming therewith a free-flowing slurry; passing said slurry into and through an initial portion of a tube having a substantial length compared to its inside diameter; vaporizing said liquid by heating said slurry during passage thereof through said tube to a temperature well above the boiling point of said liquid at the pressure existing in said tube, thereby forming a dispersion of said solid particles in the resulting vapor; disintegrating said coarse particles and forming a mass of relatively fine particles by passing said dispersion through the latter portion of said tube in turbulent flow at a velocity greater than 25 feet per second while maintaining said dispersion at a temperature well above said boiling point, but below the temperature at which chemical reaction of said material with said vapor occurs; and withdrawing relatively fine particles of said solid material from said tube.

2. A process in accordance with claim 1, also comprising the additional step of separating most of said vapor from said solid material, and withdrawing said fine particles from the system along with a minor part of said vapor.

3. A process in accordance with claim 1 which comprises maintaining the temperature of said dispersion below 1400° F. during passage thereof through said tube.

4. A process in accordance with claim 1 wherein said slurry is passed into said tube at a velocity between ½ and 10 feet per second.

5. A process in accordance with claim 1, comprising providing said disintegratable material as a non carbonaceous mineral.

6. A process in accordance with claim 1, comprising providing said disintegratable material as a metal, and providing said vaporizable liquid as a hydrocarbon which is inert to said metal.

7. A process in accordance with claim 1, also comprising maintaining a deflocculant material in said slurry to aid the dispersion of solid particles in said liquid.

8. A process in accordance with claim 1, also comprising maintaining a relatively high pressure and relatively low velocity in an upstream part of said tube, and suddenly increasing the velocity of flow of said dispersion by subjecting said dispersion to a sudden decrease in pressure prior to withdrawal from said tube.

9. A process in accordance with claim 1 comprising providing said mass as a mixture of calcium carbonate and clay, and withdrawing the pulverized particles as a Portland cement premix.

10. A process in accordance with claim 1 comprising dissolving a soluble second solid in said vaporizable liquid, depositing said second solid on said particles during passage thereof through said tube, and withdrawing said fine particles with a deposited coating of said second solid thereon.

11. A process in accordance with claim 10, wherein said disintegratable material is magnetite, and said second solid is potassium carbonate.

12. A process in accordance with claim 1, also comprising the steps of separating at least a portion of the vapor from the pulverized solid, and mixing a portion of said pulverized solid with said vaporizable liquid and relatively coarse particles to form said slurry.

13. A process in accordance with claim 1, also comprising separating at least a portion of the vapor from the pulverized solid, condensing said vapor, and mixing at least a fraction of the condensed vapor with said vaporizable liquid and relatively coarse particles to form said slurry.

14. A process in accordance with claim 1, also comprising condensing said dispersion to form a reconstituted slurry containing particles smaller in size than the particles initially fed to said tube, and recycling at least part of said reconstituted slurry through said heated tube to pulverize said particles still further.

15. A process in accordance with claim 14, also comprising excluding the ambient atmosphere from contact with said slurry and dispersion.

16. A process in accordance with claim 1, also comprising separating vapor from said heated disintegrated solid particles, and subjecting said heated disintegrated solid particles to stripping with a relatively dry gas to remove substantially all of said vapors therefrom.

17. A process in accordance with claim 1, also comprising separating at least a portion of said vapor from said particles, and subjecting said particles to further disintegration by passing said particles together with sufficient gasiform fluid for fluid flow through an elongated tubular path of flow as a confined stream moving in turbulent flow at a velocity in excess of 25 feet per second and sufficient to cause disintegration of said particles.

18. A method in accordance with claim 1, also comprising suddenly reducing the pressure on said flowing stream of slurry when heated almost to the boiling point thereby securing flash vaporization of the liquid of said slurry to form said dispersion.

19. A method in accordance with claim 1, also comprising injecting into said tube, at the locality therein containing said dispersion of solid particles in vapor, a stream of liquid much colder than said dispersion to effect shock cooling and rewetting of said particles.

20. A method in accordance with claim 1 wherein at least said latter portion of said tube is arranged as a helical coil so that said dispersion flows along a helical path in turbulent flow.

21. A process in accordance with claim 1 wherein said dispersion has a velocity greater than 100 feet per second at the outlet of said latter portion of said tube.

22. A process which comprises forming a flowable mixture of relatively coarse particles of at least one solid disintegratable material in a vaporizable liquid, forcing said mixture into and through an elongated tubular heating zone, heating said mixture during passage through said tubular zone to a temperature well above the boiling point of the liquid component of said mixture at the pressure existing in said zone, vaporizing substantially all of said liquid component during passage through said heating zone, forming therein a dispersion of solid particles in resulting vapor, passing said dispersion through a succeeding zone of high velocity flow, subjecting the flowing stream therein to turbulence and a velocity of the order of at least 25 feet per second thereby effecting disintegration of said coarse particles, and discharging from said high velocity zone said stream containing finely ground solids suspended therein.

23. A process according to claim 22 in which the stream containing finely ground solids is discharged under superatmospheric pressure from said high velocity zone.

24. A process in accordance with claim 22, also comprising condensing the vapor content of said discharged stream and reforming a flowable mixture of disintegrated particles in liquid.

References Cited in the file of this patent

UNITED STATES PATENTS

| Number | Name | Date |
|---|---|---|
| 274,288 | DeSmedt | Mar. 20, 1883 |
| 387,588 | Gostling | Aug. 7, 1888 |
| 718,729 | Rusager | Jan. 20, 1903 |
| 846,384 | Bailey | Mar. 5, 1907 |
| 1,148,570 | Bosch et al. | Aug. 3, 1915 |
| 1,204,709 | Snelling | Nov. 14, 1916 |
| 1,703,634 | Podszus | Feb. 26, 1929 |
| 1,785,283 | Podszus | Dec. 16, 1930 |
| 2,002,891 | Hall | May 28, 1935 |
| 2,242,796 | Slockton | May 20, 1941 |
| 2,521,000 | Crowley | Sept. 5, 1950 |
| 2,560,807 | Lobo | July 17, 1951 |